(12) United States Patent
Khsib

(10) Patent No.: US 12,341,985 B1
(45) Date of Patent: Jun. 24, 2025

(54) MEDIA TRANSCODING USING AN AMORPHOUS FILTER

(71) Applicant: Amazon Technologies, Inc., Seattle, WA (US)

(72) Inventor: Ramzi Khsib, Surrey (CA)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 17/806,429

(22) Filed: Jun. 10, 2022

(51) Int. Cl.
| | |
|---|---|
| H04N 19/40 | (2014.01) |
| G06V 20/40 | (2022.01) |
| H04N 19/117 | (2014.01) |
| H04N 19/136 | (2014.01) |
| H04N 19/162 | (2014.01) |
| H04N 19/167 | (2014.01) |
| H04N 19/172 | (2014.01) |
| H04N 19/23 | (2014.01) |

(52) U.S. Cl.
CPC ............ *H04N 19/40* (2014.11); *G06V 20/41* (2022.01); *H04N 19/117* (2014.11); *H04N 19/136* (2014.11); *H04N 19/162* (2014.11); *H04N 19/167* (2014.11); *H04N 19/172* (2014.11); *H04N 19/23* (2014.11); *G06V 2201/10* (2022.01)

(58) Field of Classification Search
CPC .... H04N 19/40; H04N 19/117; H04N 19/136; H04N 19/162; H04N 19/167; H04N 19/172; H04N 19/23; G06V 20/41; G06V 2201/10
See application file for complete search history.

(56) References Cited

U.S. PATENT DOCUMENTS

| | | |
|---|---|---|
| 8,683,066 B2 | 3/2014 | Hurst et al. |
| 9,350,990 B2 | 5/2016 | Orton-Jay et al. |
| 9,357,210 B2 | 5/2016 | Orton-Jay et al. |
| 10,298,985 B2 | 5/2019 | Kalagi et al. |
| 10,715,814 B2 | 7/2020 | Katsavounidis |
| 10,742,708 B2 | 8/2020 | Katsavounidis |
| 10,771,843 B2 | 9/2020 | Nair et al. |

(Continued)

OTHER PUBLICATIONS

Ramzi Khsib, "Elemental Compression Artifacts Reduction Filter", AWS Elemental, Jan. 2022, pp. 1-22.

(Continued)

*Primary Examiner* — Shahan Ur Rahaman
(74) *Attorney, Agent, or Firm* — Alexander A. Knapp; Kowert, Hood, Munyon, Rankin & Goetzel, P.C.

(57) ABSTRACT

Various embodiments of transcoding system that includes a pre-filtering system are disclosed. The pre-filtering system includes amorphous sub-filter modules and is configured to automatically configure a sequence of filter modules to be used to filter a given segment of a media object being transcoded based on artifacts resulting from an earlier decoding process. The pre-filtering system does not require prior knowledge of what encoding parameters that were used to encode the media object being transcoded. Also, the filtering system supports a wide variety of encoding formats and can automatically adjust the filtering sequence and/or filtering parameters based on the variability of compression artifacts resulting from the decoding of media objects previously encoded using a plurality of encoding formats and/or encoding parameters.

20 Claims, 14 Drawing Sheets

(56) References Cited

U.S. PATENT DOCUMENTS

| | | | |
|---|---|---|---|
| 2007/0071095 A1* | 3/2007 | Lim | H04N 19/86 |
| | | | 375/E7.19 |
| 2014/0072057 A1* | 3/2014 | Tourapis | H04N 19/176 |
| | | | 375/240.12 |
| 2015/0373328 A1 | 12/2015 | Yenneti et al. | |
| 2016/0277772 A1 | 9/2016 | Campbell et al. | |
| 2018/0139458 A1* | 5/2018 | Wang | G06T 3/4053 |
| 2018/0176285 A1 | 6/2018 | Asarikuniyil et al. | |
| 2018/0220148 A1* | 8/2018 | Ikonin | H04N 19/523 |
| 2018/0343458 A1 | 11/2018 | Katsavounidis et al. | |
| 2019/0028529 A1 | 1/2019 | Katsavounidis | |
| 2019/0327510 A1 | 10/2019 | Kalagi et al. | |
| 2019/0355192 A1 | 11/2019 | Smith et al. | |
| 2020/0288187 A1 | 9/2020 | Katsavounidis | |
| 2020/0329212 A1* | 10/2020 | Breitman | H04N 21/234309 |

OTHER PUBLICATIONS

Axel Davy, et al., "Non-Local Video Denoising by CNN," arXiv Preprint; arXiv:1811.12758v2 [cs.CV] Jul. 2, 2019, pp. 1-14.

"wikipedia," [Online]. Available: https://en.wikipedia.org/wiki/Automorphism, Jun. 5, 2022, pp. 1-4.

Pina Marziliano, et al., "Perceptual blur and ringing metrics: application to JPEG2000,," Signal Processing: Image Communication,, vol. 19, No. 2, pp. 163-172, Elsevier 2003.

Ferzli, et al., "No-Reference Objective Image Sharpness Metric Based on the Notion of Just Noticeable Blur (JNB)," IEEE Transactions on Image Processing, vol. 18, pp. 717-728, 2009.

T. Birdal, "Sharpness Estimation From Image Gradient," 2022. [Online]. Available: https://www.mathworks.com/matlabcentral/fileexchange/32397-sharpness-estimation-from-imagegradients, The MathWoed, Jul. 31, 2011, pp. 1-4.

M. A. Saad, et al., "Blind Prediction of Natural Video Quality," {IEEE Transactions on Image Processing, vol. 23, No. 3, pp. 1352-1365, 2014.

Midtskogen, et al., "The Av1 Constrained Directional Enhancement Filter (Cdef)," 2018, IEEE International Conference on Acoustics, Speech and Signal Processing (ICASSP), pp. 1193-1197, 2018.

* cited by examiner

MEDIA TRANSCODING USING AN AMORPHOUS FILTER

BACKGROUND

Distribution of media objects over network connections, such as the Internet, may be a resource intensive process. For example, in order to distribute a media object to a large number of recipients, such as a video to be distributed throughout a country or around the world, a considerable amount of network infrastructure may be required. In some situations, a content distribution network comprising servers, routers, points of presence, etc. may be used. In order to avoid the costs and burdens associated with building and maintaining such a distribution infrastructure, some entities may opt to out-source distribution to a media distribution service.

Additionally, some media distribution services may receive media objects to be distributed from multiple customers, wherein provided media objects to be distributed have been compressed using a plurality of compression formats. Also, the media distribution service (or media consuming customers of the media distribution service) may be configured to distribute and/or receive media objects compressed according to a different compression format than a compression format in which the media object was originally compressed. Thus, it may be necessary to transcode a given media object from a first compression format (e.g., an encoding using a first codec and/or a first set of associated encoding parameters) to a second compression format (e.g., an encoding using another codec and/or a second set of associated encoding parameters).

Also, media objects may be transcoded between a first compression format and a second compression format for various other reasons. For example, a media object compressed using a first codec may need to be transcoded in order to be re-played using a second codec.

In such situations, compression artifacts may be introduced when transcoding the media object from the first compression format to the second compression format. For example, losses (e.g., lossy encoding) associated with the first compression format may introduce compression artifacts. Also, in some situations a second compression format may carry over or even accentuate such compression artifacts.

Figure 1:
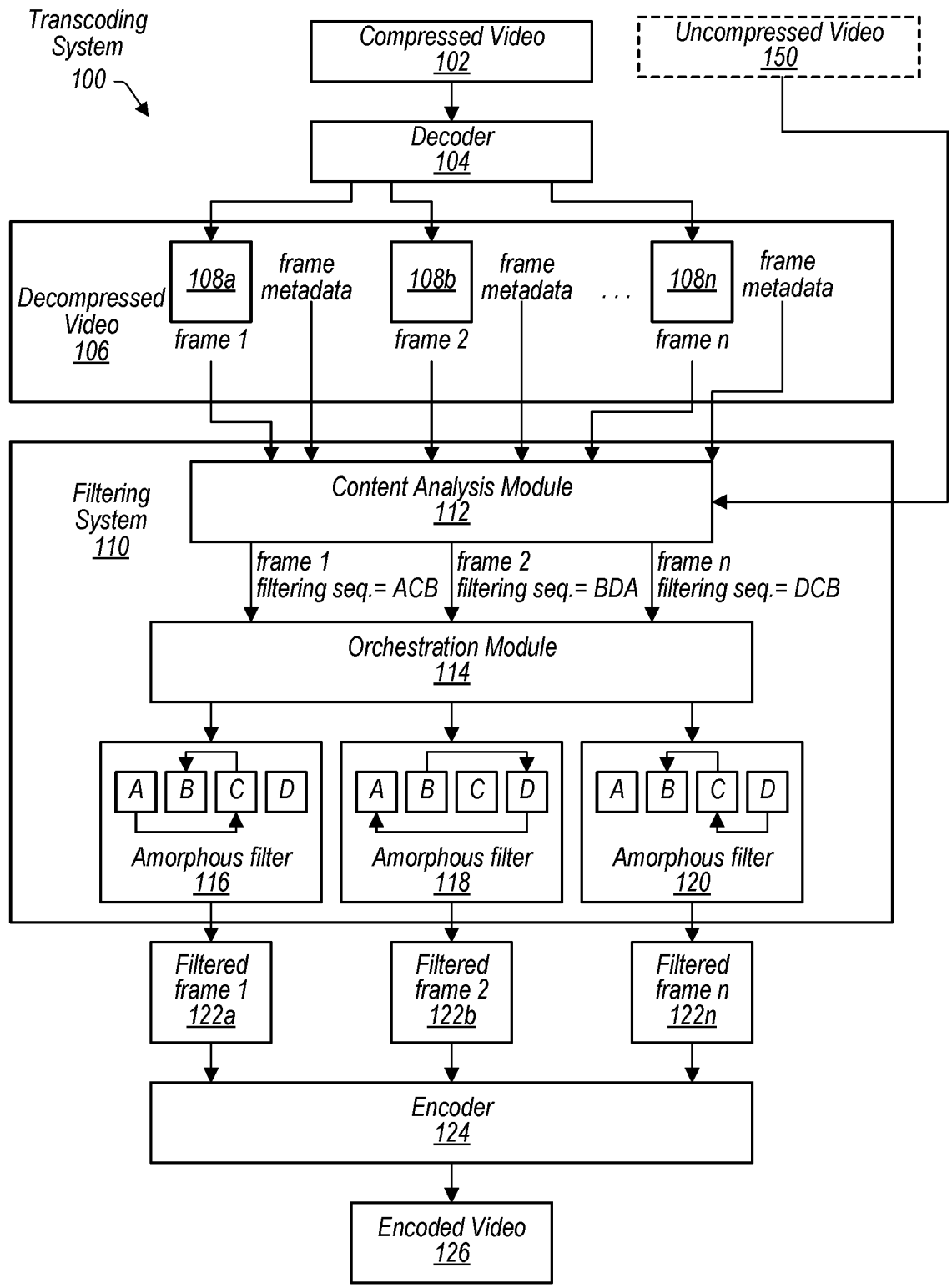
FIG. 1 illustrates elements of a transcoding system that includes a decoder that decodes a media object encoded using a first encoding format and/or a first set of encoding parameters, a pre-filtering system that filters the decoded media object using an amorphous filter, and an encoder that encodes the decoded and filtered media object using a different encoding format and/or a different set of encoding parameters, according to some embodiments.

In the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/ circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112 (f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of apparatuses and methods for implementing media object transcoding using an amorphous filtering system are described.

Due to lossy compression and de-compression, artifacts may be generated when a compressed media object, such as a video file, audio file, picture file, 3D media file, etc. is compressed and later decompressed. Compression artifacts may be defined as noticeable visual (or audio) distortions caused by the process of lossy compression. If a media object that has been previously compressed in a lossy way and then de-compressed is provided as an input to a subsequent compression process, such as a video encoder, the quality of the subsequently compressed media object may drop considerably due to compression artifacts introduced during the prior lossy compression and de-compression. For example, blocking artifacts are a common type of compression artifact that may be introduced. If blocking artifacts are present in a decoded version of a media object that is to be further encoded in a different encoding format, the blocking artifacts may appear as edges to the second encoder. Thus, the second encoder may amplify discontinuities introduced via the blocking artifacts by making coding decisions that "preserve" the edges.

In some embodiments, in order to address the issue of compression artifacts introduced due to lossy compression and decompression, a pre-filter may be used between a decoder that decodes a received media object (previously lossy encoded using a first encoding format and/or a first set of encoding parameters) and an encoder that encodes the decoded and filtered media object using a second encoding format and/or a second set of encoding parameters. However, pre-filtering a decoded media object being transcoded may be further complicated due to variabilities in encoding formats and parameters used to encode a received media object and encoding formats and parameters to be used to transcode the received media object. For example, different encoding formats and/or encoding parameters may result in different types of loss in lossy compression/decompression. Moreover, different types of loss may manifest themselves as different types of compression artifacts. Additionally, filters that address certain types of artifacts may exacerbate other types of artifacts. Thus, filtering sequencing is an important factor in pre-filtering decoded media objects. Also, in some embodiments, a transcoding system, may be used to provide a transcoding service to a plurality of customers, where there is a large amount of variability in encoding formats and encoding parameters used by the various customers to encode media objects that are provided to the transcoding service for transcoding. Also, the plurality of customers may also exhibit considerable variability in selections of encoding formats and/or encoding parameters that are selected to be used to encode the transcoded media objects. Thus, a filtering system used in a transcoder system may need to be able to filter a large variety of compression artifacts generated in various encoding formats and due to various encoding parameters. Also, the filtering system may further need to be able to configure the pre-filtering such that selected types of filtering applied by the pre-filtering system do not introduce other artifacts that are problematic for a downstream encoder that has been selected to encode the filtered media object using a customer selected encoding format and/or customer selected set of encoding parameters.

In some embodiments, a filtering system (also referred to herein as a pre-filtering system because it pre-filters content that is to be re-encoded using a second (e.g., selected) encoding format and/or set of encoding parameters) may include a content analysis module that is configured to identify types of compression artifacts present in a decoded version of a media object (e.g. an artifact signature) and may also include an orchestration module configured to determine a sequence of filter types to be applied to the decoded media object to filter the types of compression artifacts identified by the content analysis module, wherein the sequence is selected taking into account interactions between filter types. For example, if both blocking artifacts and blurriness artifacts are detected, a de-blocking filter may be applied before a sharpening filter. This is because if the sharpening filter were to be applied first, it would sharpen the discontinuities (e.g., edges) caused by the blocking artifacts, thus accentuating the blocking artifacts. Moreover, in some embodiments, a decoder may log encoder parameters determined during the decoding process, such as quantization parameters, whether a given frame was encoded using an intra-frame encoding format or was encoded using an inter-frame encoding format (e.g., temporal encoding), motion vectors used in the temporal encoding, etc. These encoding parameters and/or an encoding format (e.g., MPEG 1, MPEG 2, AVC, HEVC, VVC, AV1, etc.) may be logged as metadata associated with segments of the media object, such as frames, that have been decoded. In such embodiments, a content analysis module may be provided the decoded media object and associated metadata generated by the decoder. The content analysis module and an associated orchestration module may further use the associated metadata to select filtering sequences and/or filtering strengths to be used to pre-filter the decoded media object.

In some embodiments, an amorphous filter may be configured to filter the decoded media object using a set of sub-filters that process the decoded media object in a sequence determined by the orchestration module. For example, the amorphous filter may include sub-filters and routing mechanisms that can route an output of a given sub-filter to any of the other sub-filters based on sequencing instructions provided by the orchestration module. As an example, if an amorphous filter includes sub-filters "A", "B", "C", "D", and "E", the amorphous filter may be configured to process a decoded media object using any sequence of the sub-filters, such as ABCDE, ACDE, EBCA, EADCB, AB, CE, A, D . . . etc. In this way, sub-filters may only be applied when it is determined they are needed based on artifact types detected in the decoded media object. Also, of the types of filters that are determined to be needed, the ordering of the filters may be strategically determined to avoid negative interactions between filtering types, such as sharpening before de-blocking as mentioned in one of the examples discussed above.

FIG. 1 illustrates elements of a transcoding system that includes a decoder that decodes a media object encoded using a first encoding format and/or a first set of encoding parameters, a pre-filtering system that filters the decoded media object using an amorphous filter, and an encoder that encodes the decoded and filtered media object using a different encoding format and/or a different set of encoding parameters, according to some embodiments.

A compressed media object, such as compressed video 102, is provided to a decoder, such as decoder 104. The compressed media object may be a media object submitted to a transcoding system 100 by a customer of the transcoding system 100. The decoder 104 decodes the compressed video 102 to yield decompressed video 106. In some embodiments, the decoder 104 may further generate metadata for the decompressed video 106, wherein the metadata indicates encoding parameters that had been used to encode segments of the compressed video 102. For example, frame metadata may be logged for frames 108a, 108b, through 108n. The decompressed video 106 and associated metadata is provided to filtering system 110 which pre-filters the decompressed video 106 prior to re-encoding the decompressed video 106 via encoder 124 (which may encode the decompressed video using an encoding format and/or encoding parameters that are different than those used to encode compressed video 102). In some embodiments, the transcoding system 100 may also, or alternatively, receive an uncompressed (e.g., raw) video 150. The uncompressed video 150 may bypass the decoder 104 and may be provided to filtering system 110.

Filtering system 110 includes content analysis module 112, orchestration module 114, and one or more amorphous filters 116, 118, and 120. Note that three amorphous filters are shown processing frames in parallel. However, in some embodiments, more or fewer amorphous filters may be used and the frames may be processed sequentially or at least in part in a parallel fashion. For respective ones of the frames, content analysis module 112 and orchestration module 114 determine an artifact signature and, based on the determined artifact signature, select a filtering sequence to be used to filter the given frame. In some embodiments, the content analysis module and/or orchestration module comprise a light-weight trained machine learning model that comprises a directory of artifact signatures and associated filtering sequences to be used when a respective one of the artifact signatures is detected. In some embodiments, the artifact signature may further be determined based on metadata associated with a given frame. For example, if the metadata indicates that a frame was encoded using an intra-frame encoding process a different artifact signature may be determined than if the metadata indicated the frame had been encoded temporally (e.g., using an inter-frame encoding process). The content analysis module 112 and orchestration module 114 then provide the determined filtering sequences to the amorphous filters 116, 118, and 120 which cause the amorphous filters to arrange sub-filter elements to process the given frame using sub-filters arranged in the determined sequence. In some embodiments, the different sub-filter modules may be software modules designed to filter a video frame for specific types of artifacts. For example, the sub-filters may include a de-noising filter, a de-blocking filter, a sharpening filter, a de-ringing filter, etc. In some embodiments, the orchestration module may determine a sequence that uses some or all of the sub-filter modules arranged in any order. For example, in FIG. 1 sub-filters A, B, and C are selected to be used and are sequenced such that frame 1 is first filtered using sub-filter A, then sub-filter C, then sub-filter B. However, for frame 2 sub-filter elements A, B, and D are selected to be used and are sequenced such that frame 2 is first filtered using sub-filter B, then sub-filter D, then sub-filter A. As another example, for frame n, sub-filters B, C, and D are selected to be used and are sequenced such that frame n is first filtered by sub-filter D, then sub-filter C, then sub-filter B.

In some embodiments, filtering system 110 may filter artifacts in a raw video, such as uncompressed video 150. Also, filtering system 110 may filter artifacts, such as compression artifacts in a decompressed version of a previously compressed video, such as in in decompressed video 106 that has been decoded from compressed video 102. In some embodiments, compressed video 102 may have been lossy encoded or may have been encoded in a loss-less manner.

The filtered frames that have been filtered by the selected sub-filters in the selected sequence are then provided to encoder 124. Encoder 124 may then re-compress/re-encode the decompressed and filtered media object (e.g., video 102 that has been decompressed and filtered via decoder 104 and filtering system 110 and/or uncompressed video 150 that has been filtered via filtering system 110) in a selected format and using selected encoding parameters. For example, a customer may submit a video encoded using MPEG1 to transcoding system 100 to transcode the video into an HEVC format. Furthermore, the filtering system 110 may filter out artifacts generated when decoding the MPEG 1 version of the video such that these artifacts are not encoded into the HEVC version.

Figure 2:
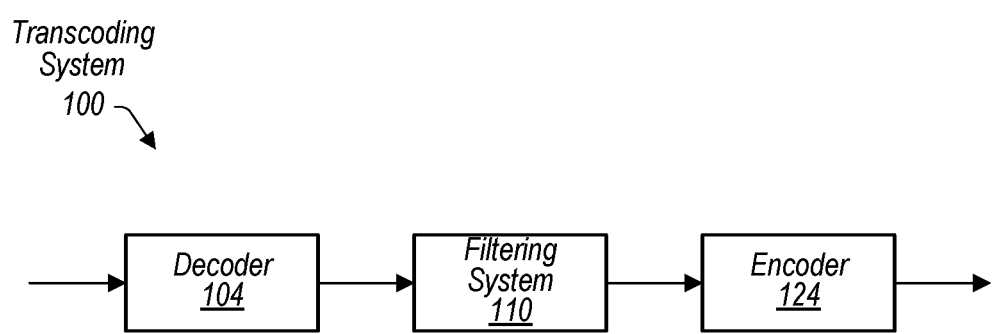
FIG. 2 is a flow diagram illustrating high-level components of the transcoding system, according to some embodiments.

FIG. 2 is a flow diagram illustrating high-level components of the transcoding system, according to some embodiments. For example, at a high-level, a transcoding process performed by transcoding system 100 comprises decoding a received media object using a decoder 104, pre-filtering the decoded media object using a filtering system 110 to remove compression artifacts introduced by decoder 104, and then encoding the decompressed and pre-filtered media object using encoder 124. In some embodiments, decoder 104 may be configured to decode media objects encoded using a wide variety of encoding formats and/or encoding parameters. Also, encoder 124 may support encoding the pre-filtered decompressed media object using a wide variety of customer selected encoding formats and/or encoding parameters. Moreover, filtering system 110 may be configured to detect artifact types in the decompressed video, wherein different encoding formats and/or encoding parameters used to compress a received media object introduce different artifact types when decoded. The filtering system 110 may further be configured to take into account how such artifacts will be accentuated or minimized by a selected encoding format and/or encoding parameters to be used by encoder 124. Additionally, in some embodiments, filtering system 110 may further take into account a degree to which different ones of the artifact types are perceptible by an intended recipient of the transcoded video. Based on these considerations, the filtering system selects types, sequencing, and strengths of filters to be applied to pre-filter the decompressed media object prior to the media object being re-encoded in a second format and/or using second encoding parameters via encoder 124.

Figure 3:
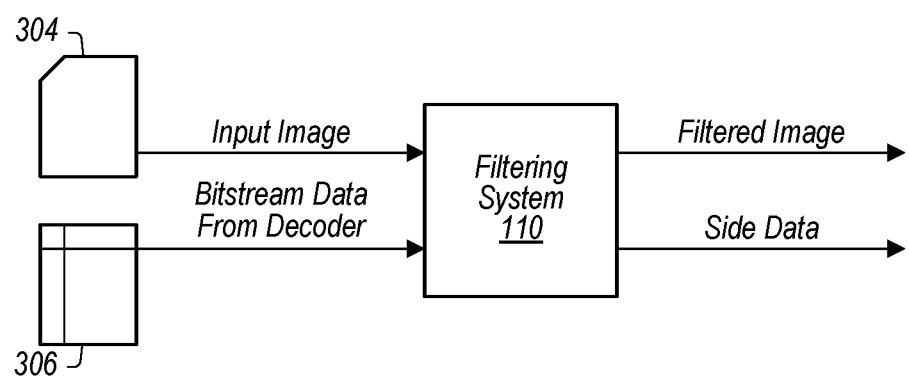
FIG. 3 is flow diagram illustrating inputs and outputs of the pre-filtering system of the transcoding system, at a high-level, according to some embodiments.

FIG. 3 is flow diagram illustrating inputs and outputs of the pre-filtering system of the transcoding system, at a high-level, according to some embodiments.

As mentioned above, the decoder 104 may log metadata related to encoding parameters used to decode respective frames of the media object being decoded. Whereas typical decoders may use these parameters internally but not make then available externally, decoder 104 may provide both a decoded image 304 that is an input to the filtering system 110, but may also provide bitstream data 306 along with the decoded image 304, wherein the bitstream data 306 includes metadata associated with the decoded image 304. For example, bit stream 306 may indicate quantization parameters (QPs) that were used in the encoding and decoding of image 304. Also, the bit stream 306 may indicate whether image 304 was encoded using an intra-frame encoding process or was temporally encoded using an inter-frame encoding process. Moreover, if temporally encoded, bit stream 306 may indicate motion vectors used in the temporal encoding process. This information may be used by filtering system 110 to pre-filter the image. The filtering system 110 may further provide the filtered image and side data to an encoder, such as encoder 124. In some embodiments, the side data may indicate what filters were applied, what strengths were used by the filters, what artifacts were detected in the input image and/or other information that may be used by encoder 124 to encode the filtered image.

Figure 4:
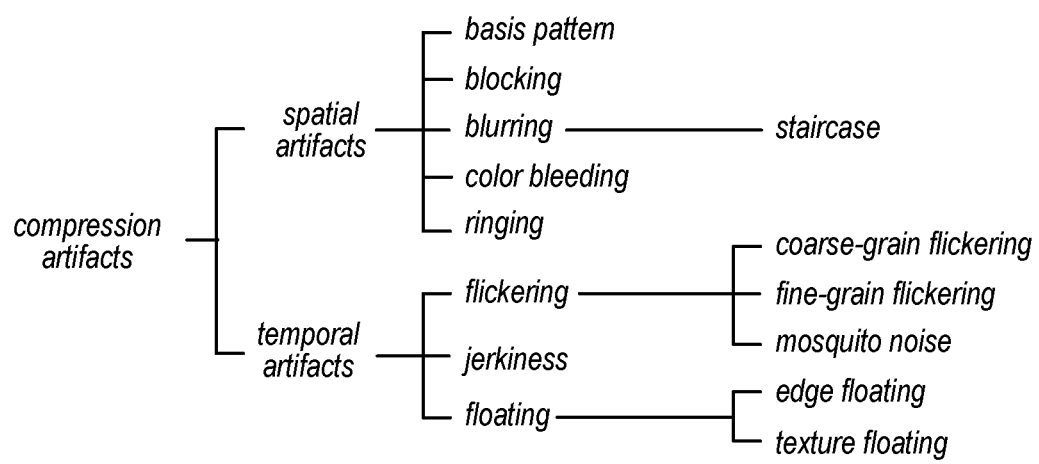
FIG. 4 illustrates example types of compression artifacts that may be filtered by the pre-filtering system, according to some embodiments.

FIG. 4 illustrates example types of compression artifacts that may be filtered by the pre-filtering system, according to some embodiments.

Artifacts is a general term for any distortions that occur after the encode process and their classification, appearance and level of annoyance may vary. As FIG. 4 shows the range of artifacts that may be introduced is quite large and there is no one fit model or description that covers all artifacts. In addition to those shown in FIG. 4, each codec may have its own set of signature artifacts and the artifacts may vary by frame type. For example, intra-encoded frames that are "key or reference" frames for later inter-encoded frames may be encoded with higher quality (less artifacts) as compared to the later "non-reference" frames, which may be encoded with coarser quantization. Also, artifacts may vary by block within a given frame.

Figure 5:
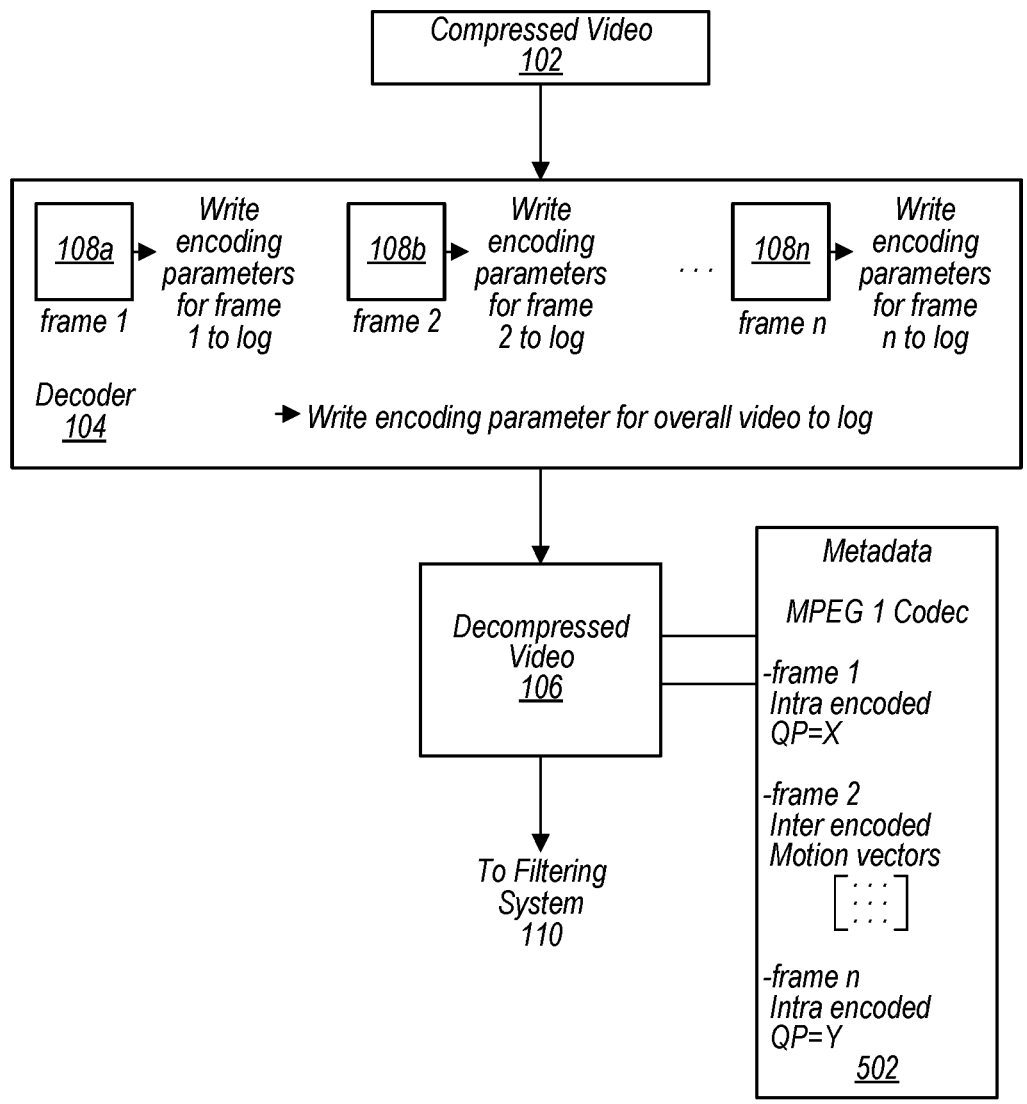
FIG. 5 illustrates a decoder of a transcoding system and metadata logged and provided by the decoder to a pre-filtering system, according to some embodiments.

FIG. 5 illustrates a decoder of a transcoding system and metadata logged and provided by the decoder to a pre-filtering system, according to some embodiments.

As discussed above, a decoder, such as decoder 104, may log encoding parameters such as a frame encoding type, quantitation parameters, motion vectors, etc. when decoding a compressed media object, such as compressed video 102. Thus, the decoder may output both the decompressed video 106 and metadata 502. In some embodiments, metadata 502 may be provided in near real time as decoded frames are output from the decoder. In some embodiments, the decoded frames and metadata may be cached and provided by the decoder as complete files, e.g., a decompressed video file and an associated metadata file, wherein the metadata file comprises references to individual frames of the decompressed video file and provides information regarding encoding parameters used for the respective frames. In some embodiments, metadata 502 may also indicate encoding parameters that apply to more than one frame. For example, metadata 502 indicates that decompressed video 106 was previously encoded using an MPEG 1 codec.

Note that in some embodiments, decoder 104 may infer what codec and/or encoding parameters were used to encode a received media object, such as compressed video 102, based on information included in the compressed bitstream. However, in some embodiments, no pre-knowledge about the compressed video 102 is required to be provided to decoder 104 by the customer. For example, a customer is not required to indicate any history about what format was used to compress video 102. Also, it should be noted that video 102 may have been compressed multiple times using different encoding formats and/or may have previously been converted from an original encoding format to another encoding format. In such situations, it is not necessary to indicate the encoding history to the decoder. Moreover, in such situations, the filtering system 110 may select filter types, filter sequencing, and filter strength without knowledge of this encoding/decoding history. Instead, the filtering system 110 may make such selections based on the types of artifacts that are observable in the decompressed video 106 and based on metadata 502.

Figure 6:
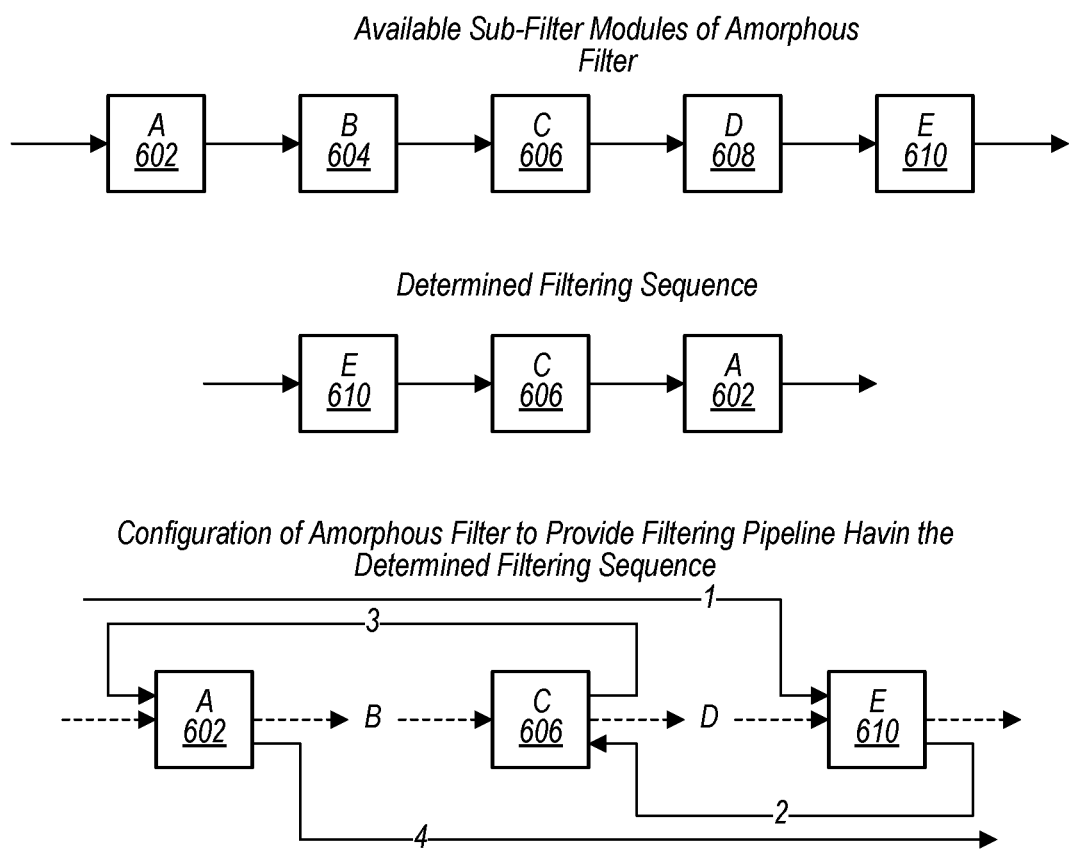
FIG. 6 illustrates an example amorphous filter that is included in a pre-filtering system of a transcoding system, according to some embodiments.

FIG. 6 illustrates an example amorphous filter that is included in a pre-filtering system of a transcoding system, according to some embodiments.

In some embodiments, amorphous filters, such as amorphous filters 116, 118, and 120, may include a plurality of independent sub-filter modules, such as sub-filter modules 602, 604, 606, 608, 610, etc. For example, sub-filter modules 602, 604, 606, 608, 610 may include a de-noising filter, a de-blocking filter, a sharpening filter, a de-ringing filter, various other filters, different respective filters of a same filter type, such as multiple de-noising filters that are to be used with images that were encoded using different codecs, etc. Similarly, multiple de-blocking filters, sharpening filters, de-ringing filters, etc. may be used where the different filters are advantageous for filtering images that were previously encoded using different codecs.

As further shown in FIG. 6 a sub-set (or all of the sub-filter modules) may be selected to be used to filter a given image. Also, a sequencing of the sub-filter modules may be dynamically adjusted for filtering each respective frame. For example, the determined filtering sequence of sub-filter module E (610), the sub-filter module C (606), then sub-filter module A (602) may be selected to filter a given image frame.

As further shown in FIG. 6, the orchestration module may cause the amorphous filter to be re-configured to filter the given image using the selected sub-filter modules (e.g., 610, 606, 602) in the determined sequence (e.g., 610 first, 606 second, 602 third, and the filtered image output fourth). In some embodiments, the sub-filter modules may be implemented in hardware or software and routing software and/or hardware between the sub-filters may be configurable to route the output of a given sub-filter module to any of the other-sub-filter modules as an input, and so on. In some embodiments, routing instructions for the filters may be included in control data provided by an orchestrator module, such as orchestrator module 114. In some embodiments, the sub-filter modules 602, 604, 606, 608, 610 may be implemented using general purpose graphics processing units (e.g., general purpose GPUs). Also, in some embodiments, the sub-filter modules 602, 604, 606, 608, 610 may be implemented using application specific integrated circuits (ASICs), or using a central processing unit (CPU).

Figure 7:
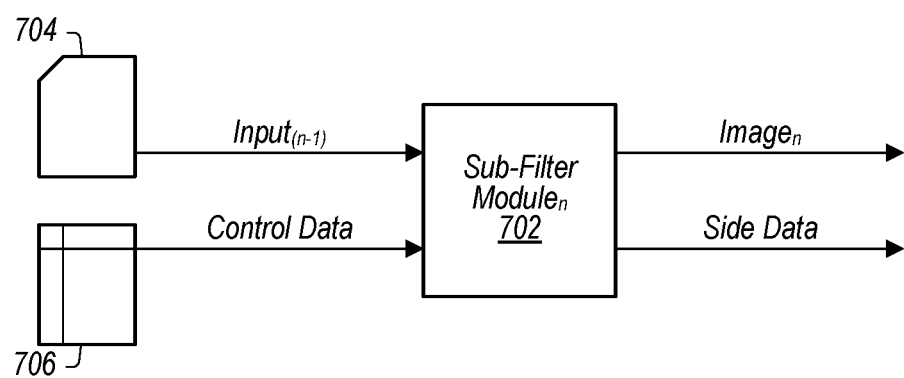
FIG. 7 illustrates inputs and outputs of an individual sub-filter module of an amorphous filter, according to some embodiments.

FIG. 7 illustrates inputs and outputs of an individual sub-filter module of an amorphous filter, according to some embodiments.

In some embodiments, an orchestration module, such as orchestration module 114, may further determine control data applicable to individual sub-filter modules, such as filter strength, or other filter parameters. Thus, as shown in FIG. 7, control data 706 may be provided to sub-filter module 702 that is processing (image n). A partially filtered version of image n is outputted from the sub-filter module as well as side data to be used as an input to a next sub-filter in a selected sub-filter sequence for filtering the given image.

The side data may include routing information that was included in the control data, the side data may also include control data to be used by a subsequent sub-filter module, and/or statistics generated by sub-filter module 702 when filtering image n. The process may be repeated for a next image (n−1) as shown in the input 704. In some embodiments, control data may be provided to each sub-filter module directly from the orchestrator module 114.

Figure 8:
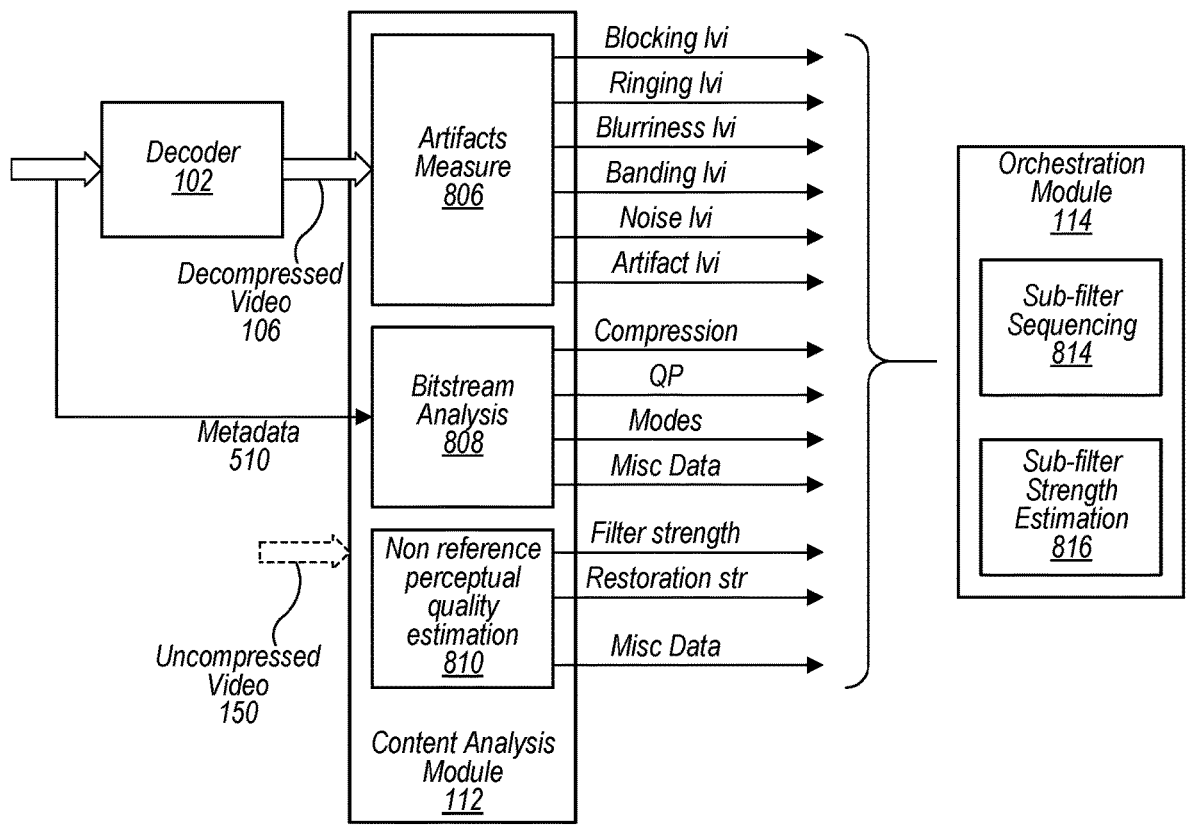
FIG. 8 illustrates a content analysis module and an orchestration module that are included in a pre-filtering system of a transcoding system, according to some embodiments.
Figure 8:
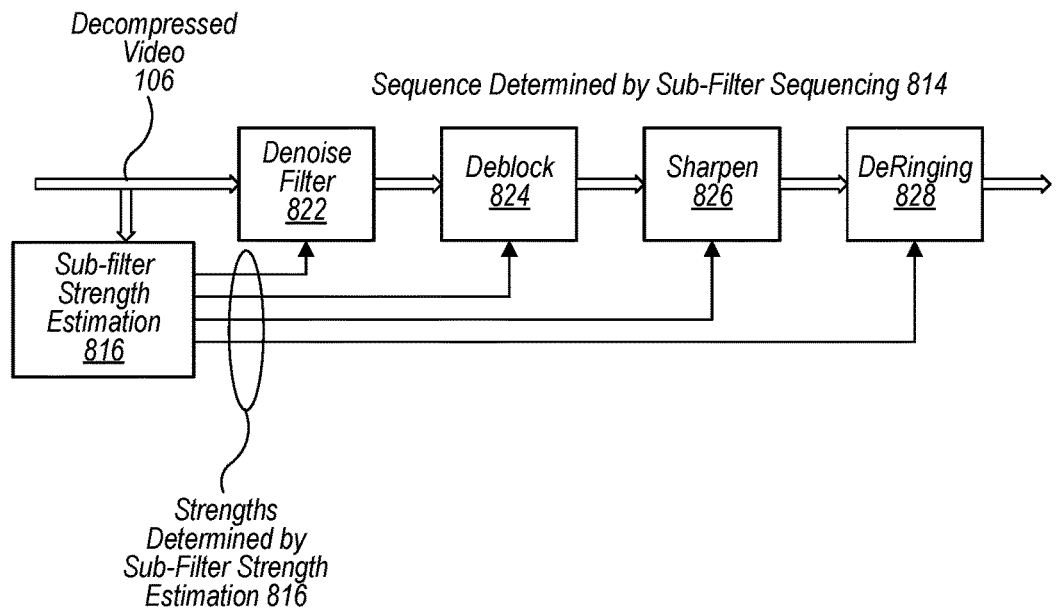

FIG. 8 illustrates a content analysis module and an orchestration module that are included in a pre-filtering system of a transcoding system, according to some embodiments.

In some embodiments, a content analysis module, such as content analysis module 112, may include an artifact measuring module 806, a bit stream analysis module 808, and a non-reference perceptual quality estimation module 810. The outputs of the content analysis module are provided to an orchestration module. In some embodiments, the orchestration module may include a sub-filter sequencing selection module 814 and sub-filter strength estimation module 816, which may determine filtering strengths to be used by various ones of the sub-filter modules, as shown in FIG. 8.

Figure 9:
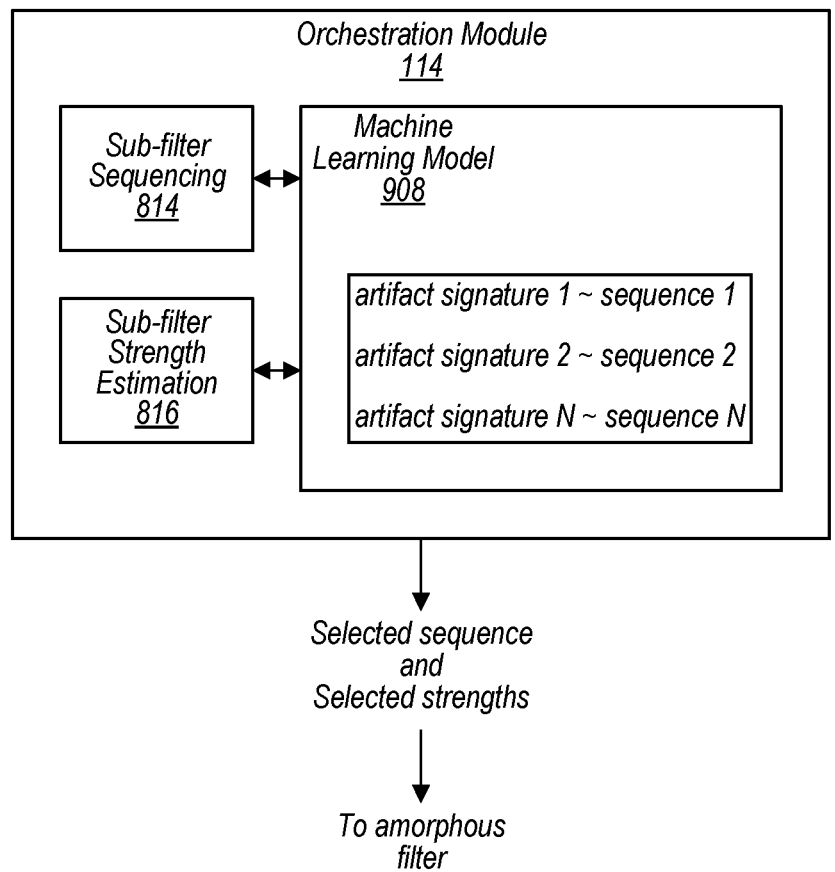
FIG. 9 illustrates additional components that may be included in an orchestration module, according to some embodiments.

FIG. 9 illustrates additional components that may be included in an orchestration module, according to some embodiments.

In some embodiments, the orchestration module 114 may further include a machine learning module 908, which may be a light weight model that has been trained by a machine learning algorithm (not shown), which may be provided, for example, by a machine learning service. The machine learning model may include artifact signature patterns and associated filtering sequences. The sub-filter sequencing module may identify an artifact signature in the input image and may select the appropriate filter sequence that corresponds with the artifact signature using the machine learning model. In some embodiments, the machine learning module may further include strength information or other parameters to be used by filters in a sequence that corresponds to a given artifact signature.

Figure 10:
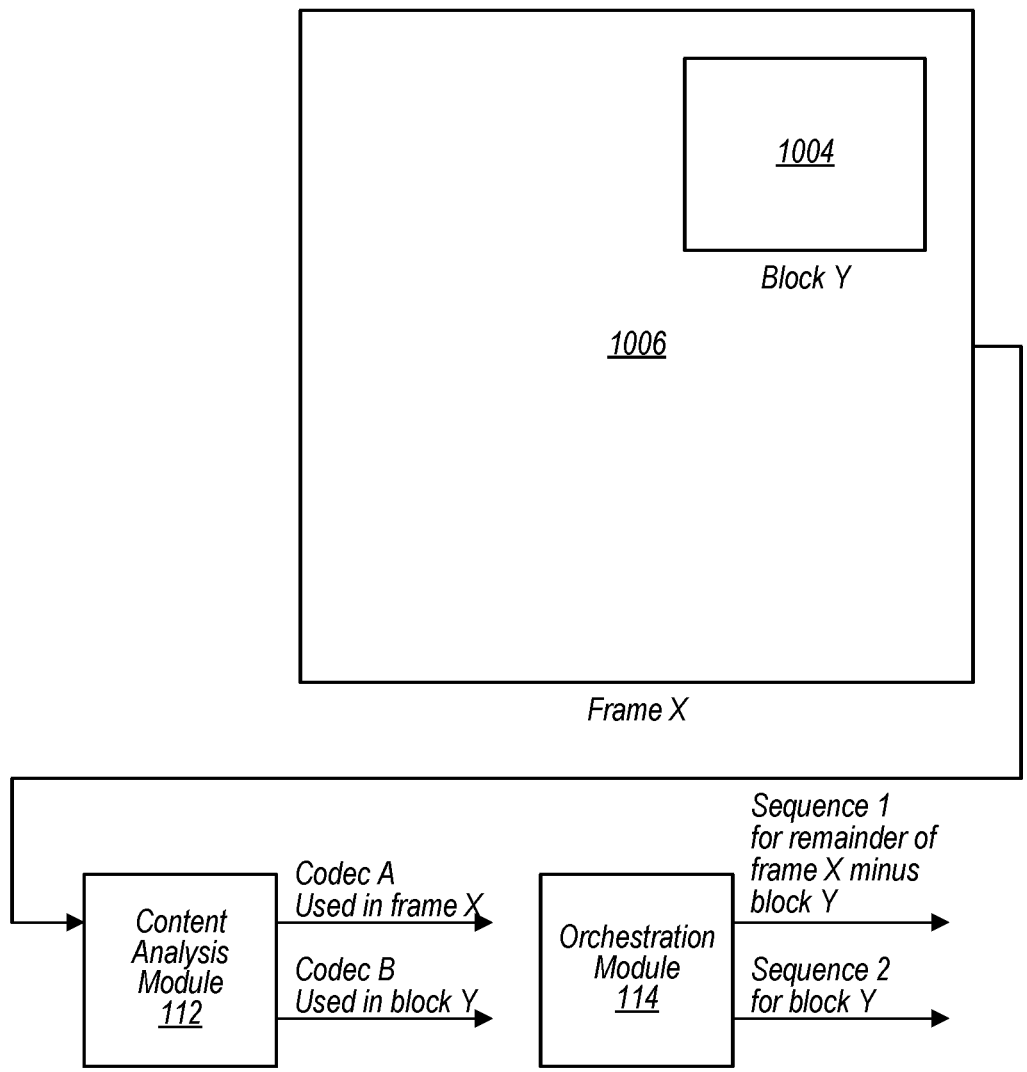
FIG. 10 illustrates an example image frame comprising a block that has been encoded using a different encoding format and/or different encoding parameters as compared to a remaining portion of the image frame, wherein the content analysis module detects the different encoding formats and/or parameters and an orchestration module selects different filtering sequences to be used when filtering the block and the remaining portion of the image frame, according to some embodiments.

FIG. 10 illustrates an example image frame comprising a block that has been encoded using a different encoding format and/or different encoding parameters as compared to a remaining portion of the image frame, wherein the content analysis module detects the different encoding formats and/or parameters and an orchestration module selects different filtering sequences to be used when filtering the block and the remaining portion of the image frame, according to some embodiments.

In some embodiments, filtering decisions may be made on a frame-by-frame basis as described above. Also, in some embodiments, filtering decisions may be made on a group of frames basis or even a video-level basis. However, in some embodiments, filtering decisions may be made at a sub-frame level. For example, as shown in FIG. 10, block Y (1004) may be identified as having a distinct artifact pattern as compared to the remainder of frame X (1006). For example, block Y may represent a video that was encoded in a first encoding format but that was later inserted into a video corresponding to frame X that was encoded using a different encoding format. Thus, data in block Y (1004) may have been encoded and decoded in the first format, re-encoded into the format of fame X and currently having been de-coded from the format used for frame X. In such a situation, content analysis module 112 may determine artifact patterns and/or a codec for block Y is different than the remainder of frame X. Also, orchestration module 114, may apply different filters and/or filtering sequences and/or filter parameters for block Y that are different than those applied to the remainder of frame X.

Figure 11:
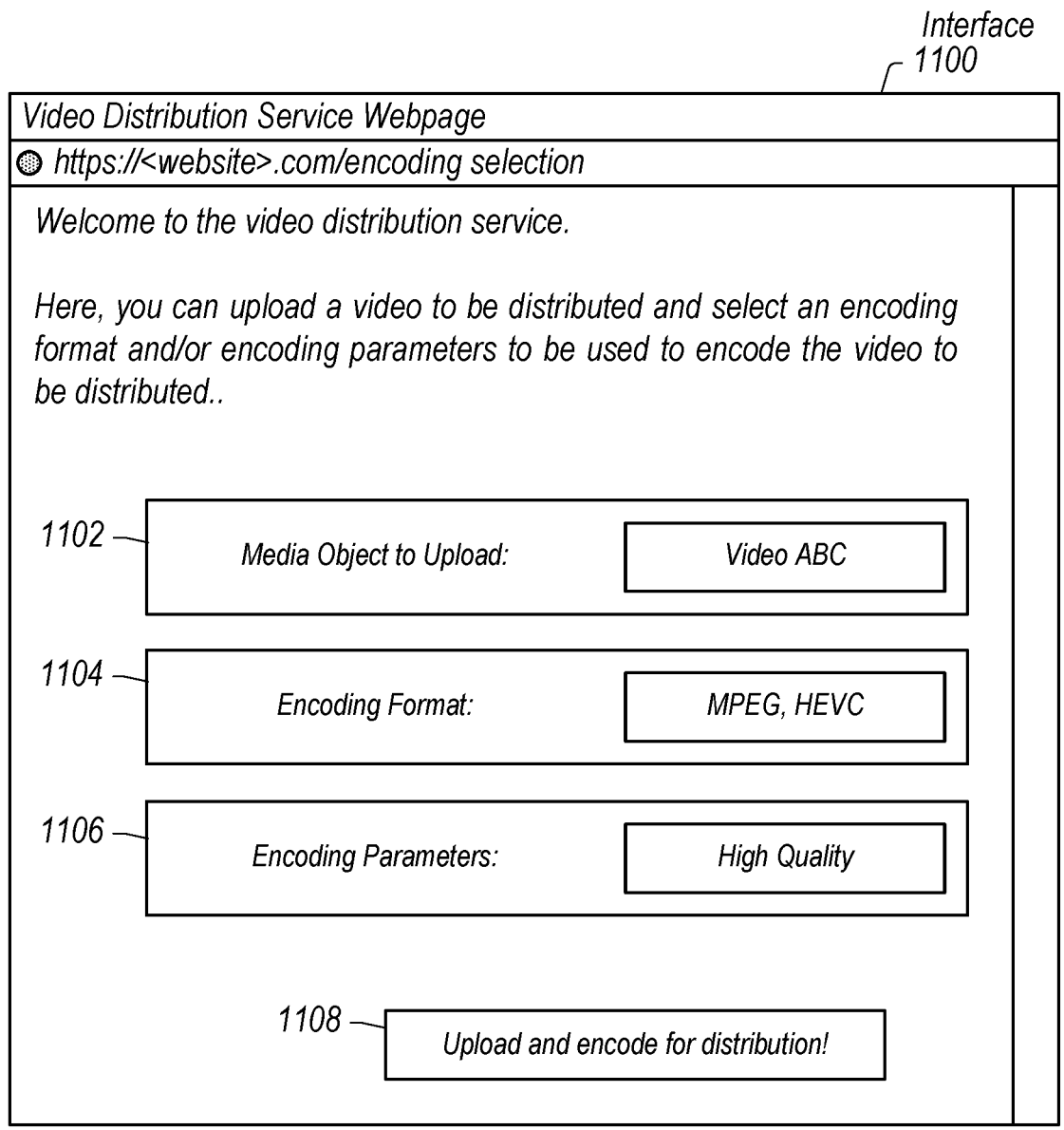
FIG. 11 illustrates an example user interface that a user of a transcoding system may use to submit a media object and may further use to select encoding parameters to be used when transcoding the media object, according to some embodiments.

FIG. 11 illustrates an example user interface that a user of a transcoding system may use to submit a media object and may further use to select encoding parameters to be used when transcoding the media object, according to some embodiments.

In some embodiments, a transcoding system/service, such as transcoding system 100, may provide a user interface, such as the example user interface 1100. In the user interface, a customer may select, via box 1102, a media object to upload. The customer may further specify an encoding format, via box 1104, to be used when distributing the uploaded media object. Additionally, the customer may optionally specify encoding parameters to be used, via box 1106. The customer may then select, via box 1108, to upload the media object and encode it for distribution.

Figure 12:
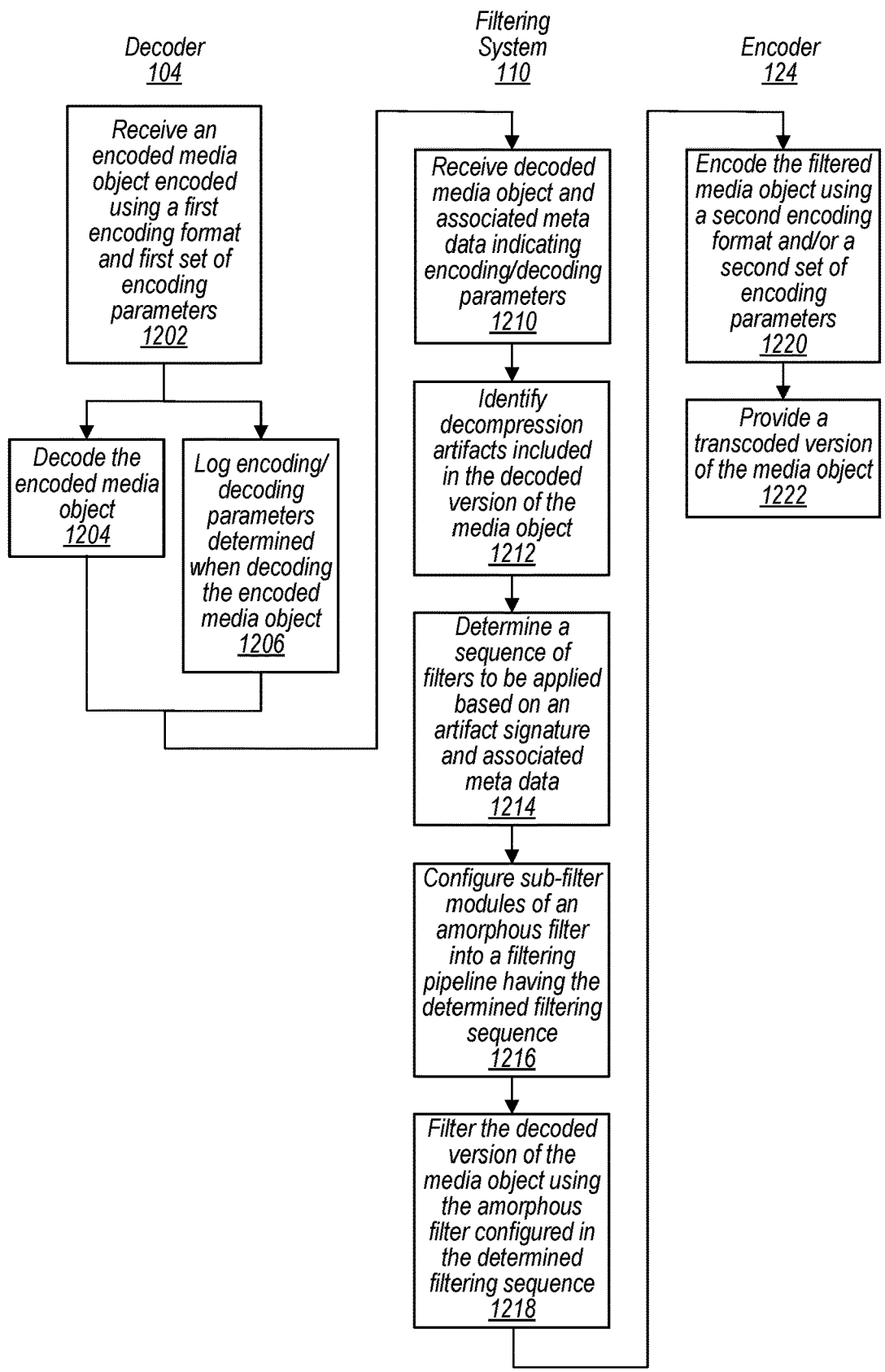
FIG. 12 is a flow diagram illustrating a method of transcoding a media object using a pre-filtering system with amorphous filters, according to some embodiments.

FIG. 12 is a flow diagram illustrating a method of transcoding a media object using a pre-filtering system with amorphous filters, according to some embodiments.

At block 1202, a decoder, such as decoder 104, receives an encoded media object encoded using a first encoding format and first set of encoding parameters. At block 1204, the decoder decodes the encoded media object and, at block 1206, the decoder logs encoding/decoding parameters (such as quantization parameters, frame type encoding (inter vs. intra), motion vectors, etc.) determined when decoding the encoded media object.

At block 1210, a filtering system, such as filtering system 110, receives the decoded media object and associated meta data indicating encoding/decoding parameters. At bloc, 1212, the filtering system identifies compression artifacts included in the decoded version of the media object. Then, at block 1214, the filtering system determines a sequence of filters to be applied to filter a segment of the decoded media object based on an artifact signature and associated meta data associated with the segment of the media object. Note that the steps shown to be performed by the filtering system 110 may be repeated for each segment of the decoded media object, such as each frame of a video as an example. At block 1216, the filtering system configures a set of sub-filter modules of an amorphous filter into a filtering pipeline having the determined filtering sequence. At block 1218, the filtering system filters the decoded version of the media object using the amorphous filter configured in the determined filtering sequence.

At block 1220, an encoder, such as encoder 124, encodes the filtered media object using a second encoding format and/or a second set of encoding parameters. At block 1222, the encoder further provides a transcoded version of the media object, for example for distribution to clients. In some embodiments, a content distribution network may be used as further described below.

An Example Transcoding System and Content Distribution Network in a Provider Network This section describes example provider network environments in which embodiments of a transcoding system and/or filtering system interfacing with a content distribution network may be implemented. However, these example provider network environments are not intended to be limiting.

Figure 13:
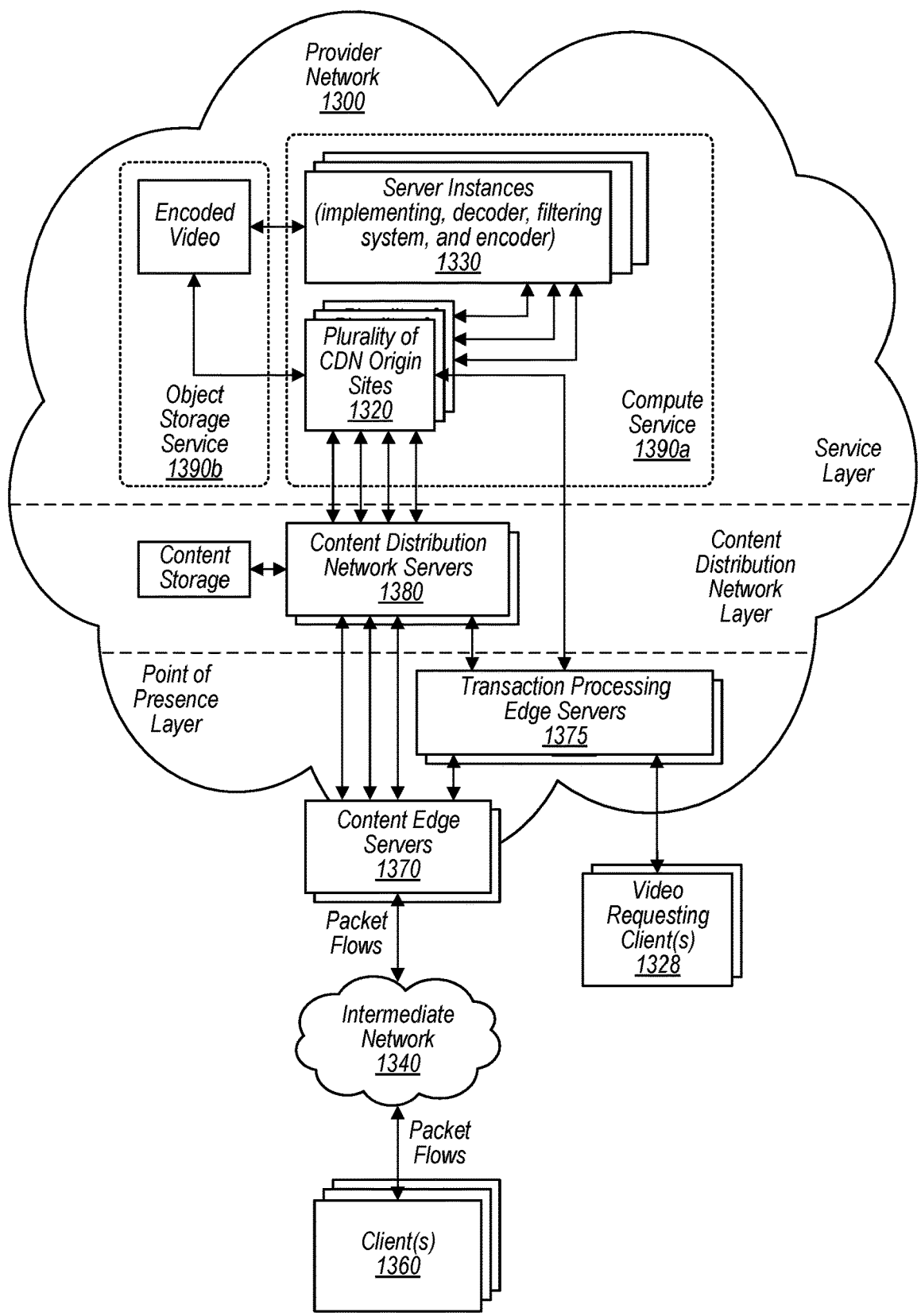
FIG. 13 illustrates a transcoding system interfacing with a content distribution network within the context of an example provider network environment, according to some embodiments.

FIG. 13 illustrates server instances 1330 of a compute service 1390*a* that implement a transcoding system and/or filter system, as described herein. Also, an object storage service 1390*b* may store an encoded video that is to be transcoded via server instances 1330 and distributed using the content distribution network, according to some embodiments. For example, in some embodiments content distribution network servers 1380, and/or a plurality of origin sites 1320, within the context of an example provider network environment 1300 may implement a content distribution network, according to some embodiments.

The content distribution network layer may comprise additional layers of a content distribution network, such as a point of presence layer as shown in FIG. 13, in some embodiments. In other embodiments, the content distribution network layer may be omitted, and the point of presence layer may communicate directly with the service layer. FIG. 13 also illustrates a service layer comprising a plurality of origin sites 1320, where each origin site comprises a plurality of server instances and associated content storage, according to some embodiments. The service layer also comprises an example transcoding service implemented via server instances 1330 in an example provider network environment. FIG. 13 also illustrates external video requesting clients 1328 which are not comprised in the provider network 1300, according to at least some embodiments. A provider network 1300 may provide resource virtualization to clients via one or more virtualization services that allow clients to access, purchase, rent, or otherwise obtain instances of virtualized resources, including but not limited to computation and storage resources, implemented on devices within the provider network or networks in one or more data centers.

Embodiments of a content distribution network are described that may be implemented on or by a provider network 1300, in some embodiments, where the content distribution network communicates with the plurality of clients 1360 to provide transcoded and filtered media objects to the clients 1360. In some embodiments, other clients such as video requesting clients 1328, may request that the media objects be distributed to clients 1360. In some embodiments, clients 1360 may request the media objects themselves. In some embodiments, a content distribution network may be implemented in enterprise networks or simple client-server networks, or any kind of network where a computer accesses a resource through a network. The content distribution network may be operated by an entity to provide one or more services, such as various types of content distribution services, accessible via the Internet and/or other networks to client(s) 1360. The content distribution network may include numerous data centers hosting various resource pools, such as collections of physical and/or virtualized computer servers 1400, storage devices, networking equipment and the like, needed to implement and distribute the infrastructure and services offered by the content distribution network. In some embodiments the content distribution network may employ computing resources for its provided services.

The client(s) 1360 and/or 1328 may encompass any type of client configurable to submit requests to the content distribution network. For example, a given client 1360 may include a suitable version of a web browser or may include a plug-in module or other type of code module configured to execute as an extension to or within an execution environment provided by a web browser. Alternatively, a client 1360 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 1360 and/or 1328 may be configured to generate network-based services requests according to a Representational State Transfer (REST)-style network-based services architecture, a document-based or message-based or network-based services architecture, or another suitable network-based services architecture. In some embodiments, the content distribution network may offer its services as web services, and the client(s) 1360 and/or 1328 may invoke the web services via published interfaces for the web services. In some embodiments, a client 1360 (e.g., a computational client) may be configured to provide access to the content distribution network to an application in a manner that is transparent to the application and other applications implemented on the client(s) 1360 utilizing content distribution resources provided by the content distribution network.

The client(s) 1360 may convey network-based services requests to the content distribution network via network connections, such as the intermediate network 1340, which, in some embodiments, can be the Internet. In various embodiments, network connections may encompass any suitable combination of networking hardware and protocols necessary to establish network-based communications between clients 1360 and the content distribution network. For example, a network connection may generally encompass the various telecommunications networks and service providers that collectively implement the Internet. A network connection may also include private networks such as local area networks (LANs) or wide area networks (WANs) as well as public or private wireless networks. For example, both a client 1360 and/or 1328 and the content distribution network may be respectively provisioned within enterprises having their own internal networks. In such embodiments, the network connection may include the hardware (e.g., modems, routers, switches, load balancers, proxy servers, etc.) and software (e.g., protocol stacks, accounting software, firewall/security software, etc.) necessary to establish a networking link between the client 1360 and/or 1328 and the Internet as well as between the Internet and the content distribution network. In some embodiments, client(s) 1360 and/or 1328 may communicate with the content distribution network using a private network rather than the public Internet.

In the illustrated embodiment, clients 1360 may request electronic content, such as media objects, from a merchant that owns the content located on the origin servers 1320 of the origin server site. The merchant might also own and/or operate the origin servers 1320 of the origin server site. The origin servers(s) 1320 may persistently store elements of content in content storage and may also generate content dynamically, e.g., based on elements of content in the content storage. Examples of electronic content may include but are not limited to electronic representations of movies, music, and television programming. In one example, the merchant may sell or rent electronic content to clients through a commerce interface, such as a web portal configured to offer an electronic catalog of items as well as logic for accepting payment for items of such catalog.

A client 1360 can communicate with a merchant system to carry out transactions for electronic content. Merchant system(s) may include systems configured to implement such a commerce interface. Clients 1360 may carry out transactions for electronic content with merchant system over one or more networks 1340 that are configured to transport electronic transmission of data or information.

In various embodiments, the merchant system(s) may rely on the content distribution network for the actual delivery of content to client systems 1360. For instance, a content distribution network may store electronic content that a merchant offers for sale to clients. The content sources may charge the merchant a fee for delivery of such content to the clients. The CDN may also provide various types of content such as web pages and their constituent elements, streaming media, downloadable media, application data, program code intended for execution at client devices, and so on.

Clients 1360 may be implemented by one or more computers or electronic devices configured to receive (e.g., download) and playback electronic content from the content distribution network. In various embodiments, clients 1360 may also include reporting logic configured to report quality metrics associated with content sources to merchant systems. For instance, when a given client system 1360 is engaged in a streaming content session with the content distribution network, the client system may record quality metrics associated with that session and send such metrics to merchant system(s). In various embodiments, different client applications of clients 1360 may perform similar reporting actions. Merchant systems may store the metrics for multiple sessions within a data store and use such metrics to generate rankings of content sources. A given ranking may rank content sources based on an expected measure of quality for a content stream between one of the content sources and one of the clients. In various embodiments, the merchant system(s) may generate a given ranking such that the cost of content delivery (e.g., the cost that content sources charge the merchant for delivering content to the clients) influences the rank of content sources.

In the illustrated embodiment, the content distribution network may be implemented by one or more points of presence that include content edge servers 1370 that are configured to provide (e.g., stream or transfer) data to clients 1360. The points of presence may also cache elements of content originally obtained from the origin server(s) 1320. Note that the content stored by origin server 1320 may be transcoded as needed by server instances 1330 in order to encode the media objects in a format suitable to stream to clients 1360. Accordingly, each of the points of presence or content edge servers 1370, may include a content cache. In various embodiments, a given CDN may include one or more servers, routers, caches, and other components in order to provide content to multiple geographically-dispersed clients. In various embodiments, any given component of the content distribution network may be implemented on one or more computers, such as that of FIG. 14 described below.

A provider network 1300 may provide a compute service 1390*a* implemented by physical server nodes to clients, such as compute instances 1320 or 1330. The compute service may also contain other server instances for use by other clients and/or other customers of the provider network 1300. Respective ones of the plurality of origin sites 1320 may comprise its own set of server instances and content storage, for example. As another example, the provider network 1300 provides a virtualized data storage service or object storage service 1390*b* which may include a plurality of data storage instances implemented by physical data storage nodes. The data storage service or object storage service 1390*b* may store media objects to be distributed on behalf of a client. The provider network may also include multiple other client services that pertain to one or more customers or clients. The clients 560 may access any one of the client services 1590*a*, 1590*b*, or the database Communication from the clients to an instance of a compute service 1390*a* may be routed to the appropriate instance by the content distribution network servers 1380. Server nodes in the compute service 1390*a* may each implement a server, for example a web server or application server or a cloud-based browser that might comprise an origin site. One or more content distribution network servers 1380 may be implemented in a network connection manager layer between a border network and a production network. The transaction processing edge server 1375 can communicate with appropriate transaction entities to perform a transaction, such as distributing a media object to a subscribing client.

Illustrative System

Figure 14:
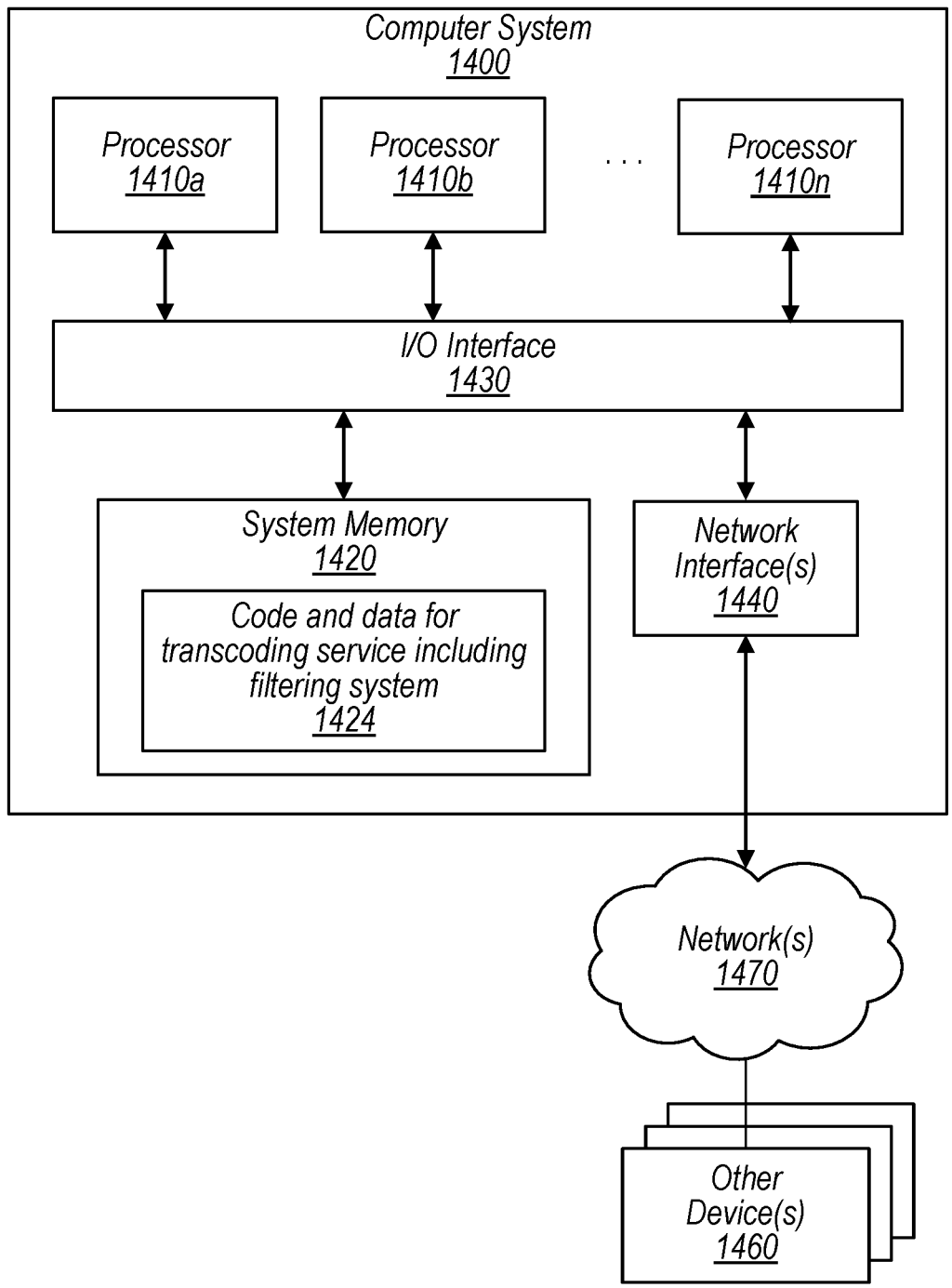
FIG. 14 is a block diagram illustrating an example computer system that may be used for the transcoding system (or components thereof), according to some embodiments.

FIG. 14 is a block diagram illustrating an example computer system that may be used for a transcoding system and/or pre-filtering, according to some embodiments. In at least some embodiments, a computer that implements a portion or all of the methods and apparatus for a transcoding and/or pre-filtering system as described herein may include a general-purpose computer system or computing device that includes or is configured to access one or more computer-accessible media, such as computer system 1400 illustrated in FIG. 14. Note that FIG. 14 is a block diagram illustrating an example computer system that may be used in some embodiments. This computer system can be used as a network connection manager, for example, or as a backend resource host which executes one or more of backend resource instances, or one or more of the plurality of compute instances 1330 in the compute service 1390a. In the illustrated embodiment, computer system 1400 includes one or more processors 1410 coupled to a system memory 1420 via an input/output (I/O) interface 1430. Computer system 1400 further includes a network interface 1440 coupled to I/O interface 1430.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above with regard to transcoding and/or pre-filtering. For example, such program instructions are shown stored within system memory 1420 as the code and data for a transcoding system including a filtering system 1424.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1470, such as other computer systems or devices as illustrated in FIGS. 1 thru 13. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-accessible medium configured to store program instructions and data as described above for FIGS. 1 through 13 for implementing a transcoding and/or pre-filtering system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A media transcoding system, comprising:
   one or more computing devices configured to implement a decoder configured to:
   receive a media object, formatted using a first format; and
   provide a decoded version of the media object and associated metadata indicating one or more of a first set of parameters associated with the first format;

one or more computing devices configured to implement a filtering system, comprising:
 a content analyzer, configured to:
  receive a segment of the decoded version of the media object and a corresponding portion of the metadata indicating at least some of the first set of parameters associated with the first format; and
  determine a set of one or more artifacts present in the segment of the decoded version of the media object;
 an orchestrator, configured to:
  determine a sequence of types of filtering to be applied to the segment to filter the identified set of artifacts, wherein the sequence is determined based, at least in part, on types of artifacts included in the set of one or more artifacts and the corresponding portion of the metadata for the segment, wherein determining the sequence comprises:
   selecting a first type of filter to be applied first in the sequence; and
   selecting a second type of filter to be applied second in the sequence after applying the first type of filter; and
 an amorphous filter comprising:
  a plurality of sub-filters configured to filter different respective types of artifacts;
 wherein the orchestrator is configured to automatically re-configure a data flow between respective ones of the sub-filters such that the segment is filtered by the respective ones of the sub-filters according to the sequence determined by the orchestrator;
 wherein for one or more other segments of the decoded version of the media object the content analyzer determines a different sequence, wherein determining the different sequence comprises:
  selecting a first type of filter to be applied first in the different sequence; and
  selecting a second type of filter to be applied second in the different sequence after applying the first type of filter,
  wherein the sequence and the different sequence indicate a plurality of different respective ones of applied sub-filters or apply different respective ones of the sub-filters first and apply different respective ones of the sub-filters second; and
 one or more computing devices configured to implement an encoder configured to:
  encode a filtered version of the decoded version of the media object, filtered by the filtering system, using a second format and a second set of parameters.

2. The media transcoding system of claim 1, wherein the orchestrator is further configured to:
 adjust respective filtering strengths or other filtering parameters of the respective ones of the sub-filters included in the sequence and the different sequence.

3. The media transcoding system of claim 1, wherein the types of artifacts included in the segment comprise one or more of:
 a blocking artifact;
 a ring artifact; or
 a blurriness artifact, and
wherein the sequence or the different sequence of sub-filters comprise one or more of:
 a de-blocking filter;
 a de-ringing filter; or
 a sharpening filter.

4. The media transcoding system of claim 1, wherein the first set of parameters indicated in the metadata comprise one or more of:
 quantization parameters used in encoding the encoded media object;
 whether the segment of the encoded media object was encoded as an intra-frame or an inter-frame; or
 motion vectors used in encoding the segment of the encoded media object.

5. The media transcoding system of claim 1, further comprising:
 one or more computing devices configured to implement a user interface for the media transcoding system, wherein the user interface is configured to:
 receive the encoded media object; and
 receive a selection of the second format and/or the second set of parameters to be used to transcode the received encoded media object.

6. The media transcoding system of claim 1, wherein the one or more computing devices that implement the decoder are configured to:
 decode encoded versions of media objects encoded using a plurality of encoding formats and encoded using a plurality of versions of respective ones of the encoding formats.

7. A method, comprising:
 identifying a set of one or more artifacts present in a segment of a media object;
 determining a sequence of types of filtering to be applied based, at least in part, on types of artifacts included in the set of identified artifacts, wherein determining the sequence comprises:
  selecting a first type of filter to be applied first in the sequence; and
  selecting a second type of filter to be applied second in the sequence after applying the first type of filter;
 automatically re-configuring, based on the determined sequence, a plurality of sub-filters of an amorphous filter;
 filtering the segment of the media object using respective ones of the sub-filters of the amorphous filter according to the determined sequence; and
 for one or more other segments of the decoded version of the media object, performing said determining, said automatically re-configuring, and said filtering,
  wherein for at least some of the one or more other segments of the media object, different filtering sequences are determined based on different types of artifacts identified in the one or more other segments, wherein determining a given one of the different filtering sequences comprises:
  selecting a first type of filter to be applied first in the given one of the different filtering sequences; and
  selecting a second type of filter to be applied second in the given one of the different filtering sequences after applying the first type of filter, wherein the sequence and the given one of the different filtering sequences include a plurality of different respective ones of the applied sub-filters or apply different respective ones of the sub-filters first and apply different respective ones of the sub-filters second.

8. The method of claim 7, wherein said determining, said automatically re-configuring, and said filtering are performed as part of a continuous processing pipeline for transcoding an encoded version of the media object from a first encoding format to a second encoding format.

9. The method of claim 7, further comprising:
decoding an encoded version of the media object into a decoded version of the media object;
logging one or more encoding/decoding parameters used in decoding the encoded version of the media object; and
providing the logged encoding/decoding parameters to a filtering system that performs said determining, said automatically re-configuring, and said filtering.

10. The method of claim 7, wherein the media object is a video and the segment of the media object is a frame of the video.

11. The method of claim 7, wherein said determining the sequence of the types of filtering to be applied to the segment is performed using a machine learning model.

12. The method of claim 11, wherein the machine learning model is trained using encoded versions of media objects encoded using a plurality of encoding formats and, within a given encoding format, using a plurality of versions of the given encoding format and/or a plurality of encoding parameters supported by the given encoding format.

13. The method of claim 11, wherein the machine learning model is a light-weight model comprising:
identified artifact set signatures; and
for each identified artifact set signature, an associated sequence of filtering types to be applied.

14. The method of claim 11, wherein the machine learning model is further trained to identify a portion of a frame comprising content encoded using a different encoding format than a remaining portion of the frame,
wherein a different sequence of filtering types is determined and applied for the portion of the frame than is determined and applied for the remainder of the frame.

15. The method of claim 11, further comprising:
adding one or more additional sub-filters to the amorphous filter; and
training an updated version of the machine learning model to incorporate the one or more added sub-filters as filtering type candidates to include in the sequence.

16. The method of claim 15, further comprising:
updating a decoder to support one or more additional encoding formats,
wherein the one or more added sub-filters are configured to filter compression artifacts corresponding to the one or more additional encoding formats for which the decoder has been updated to support.

17. The method of claim 7, further comprising:
providing a user interface configured to receive:
an encoded version of the media object; and
a selection of an encoding format to be used to transcode the received encoded version of the media object;
decoding the received encoded version of the media object into a decoded version of the media object;
performing said determining, said automatically re-configuring, and said filtering for a plurality of segments of the decoded version of the media object; and
encoding a filtered version of the decoded version of the encoded media object using the selected encoding format indicated via the user interface.

18. One or more non-transitory, computer-readable, storage media storing program instructions that, when executed on or across one or more processors, cause the one or more processors to:
identify a set of one or more artifacts present in a segment of a decoded version of a media object;
determine a sequence of types of filtering to be applied to the segment based, at least in part, on types of artifacts included in the set of identified artifacts, wherein determining the sequence comprises:
selecting a first type of filter to be applied first in the sequence; and
selecting a second type of filter to be applied second in the sequence after applying the first type of filter;
automatically re-configure a data flow between a plurality of sub-filters of an amorphous filter; and
filter the segment using respective ones of the sub-filters of the amorphous filter according to the determined sequence;
determine a different sequence for one or more other segments of the decoded version of the media object, wherein determining the different sequence comprises:
selecting a first type of filter to be applied first in the different sequence; and
selecting a second type of filter to be applied second in the different sequence after applying the first type of filter,
wherein the sequence and the different sequence include a plurality of different respective ones of the applied sub-filters or apply different respective ones of the sub-filters first and apply different respective ones of the sub-filters second.

19. The one or more non-transitory, computer-readable, storage media of claim 18, wherein said determining, said automatically re-configuring, and said filtering are performed as part of a continuous processing pipeline for transcoding an encoded version of the media object from a first encoding format to a second encoding format.

20. The one or more non-transitory, computer-readable, storage media of claim 18, wherein the program instructions, when executed on or across the one or more processors, further cause the one or more processors to:
decode an encoded version of the media object; and
log encoding or decoding parameters used in decoding the encoded version of the media object,
wherein said determining the sequence of types of filtering to be applied to the segment is further determined based on the logged encoding or decoding parameters associated with the segment.

* * * * *